United States Patent
Antonelli et al.

(10) Patent No.: US 7,259,864 B1
(45) Date of Patent: Aug. 21, 2007

(54) OPTICAL UNDERWATER ACOUSTIC SENSOR

(75) Inventors: Lynn T. Antonelli, Cranston, RI (US); Kenneth M. Walsh, Middletown, RI (US); Benoit G. Gauthier, Little Compton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 11/070,400

(22) Filed: Feb. 25, 2005

(51) Int. Cl.
*G01B 11/02* (2006.01)
(52) U.S. Cl. .................................................. 356/502
(58) Field of Classification Search ............... 356/35.5, 356/496, 498, 502; 181/140; 367/149
See application file for complete search history.

(56) References Cited

U.S. PATENT DOCUMENTS

| | | | |
|---|---|---|---|
| 4,536,861 A | * | 8/1985 | Graindorge et al. ........ 367/149 |
| 5,065,331 A | * | 11/1991 | Vachon et al. ............. 356/35.5 |
| 5,373,487 A | | 12/1994 | Crawford et al. |
| 6,188,644 B1 | | 2/2001 | Walsh et al. |
| 6,349,791 B1 | | 2/2002 | Glenning et al. |

\* cited by examiner

*Primary Examiner*—Michael A. Lyons
(74) *Attorney, Agent, or Firm*—James M. Kasishcke; Michael P. Stanley; Jean-Paul A. Nasser

(57) ABSTRACT

An acoustic sensor used in underwater applications. The sensor includes a reflective material adhered to a structure, such as an outer submarine hull or any marine vessel hull. A laser interferometer is placed on the side of the structure with the reflective material. The laser interferometer sends a plurality of laser beams, in sequence or all at one time, to a plurality of points across the retro-reflective material. The laser beams reflect back to the interferometer, which captures the reflected beams using receiving optics. The phase modulation of the reflected laser beams is compared to a reference laser beam within the interferometer to obtain the vibration velocity characteristics of the hull surface structure. Since the reflective material is adhered to the structure, the structure vibration is the same as the vibration of the reflective material. From this vibration, the acoustic pressure associated with the structure may be calculated.

13 Claims, 2 Drawing Sheets

OPTICAL UNDERWATER ACOUSTIC SENSOR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to sensors, more particularly to acoustic sensors, and most particularly to acoustic sensors for underwater applications.

2. Description of the Related Art

In the past, acoustic transducers and hydrophones have been used to convert underwater acoustical energy into electrical signals. These are typically ceramic-based products that work on the principle of either piezoelectricity or magnetostriction. These devices are typically capable of both transmitting and detecting acoustic pressure in the water. However, the receiver aperture and bandwidth of these devices are limited.

Laser-based techniques for detection of sound for underwater applications have also been developed. These include optical fiber schemes and alternatively, laser interrogation of a water column. Optical fiber arrangements detect underwater sound by monitoring changes in the optical fiber properties (optical or physical) due to an incident acoustic pressure wave. Some arrangements normally require a polished optical fiber to deliver light in close proximity to a membrane similar to an optical fiber microphone. These devices also require obtaining properties such as the Fresnel reflection at the laser output (fiber end) and an acoustic collector unit. Other devices coil the optical fiber around a mandrel that stretches or compresses the fiber when subjected to an acoustic pressure field. [reference: C. Davis, E. Carome, M. Weik, S. Ezekiel, and R. Einzig, "Fiberoptic Sensor Technology Handbook', Optical Technologies Inc., ch. 5, 1986.] The strain on the optical fiber affects the phase of the light propagating within the fiber.

Alternatively, laser light, typically near the 500 nanometer wavelength region, is directed into the water and reflected from particles within the water vibrating in response to an acoustic pressure wave. The reflected light is processed to provide detected sound pressure levels and the bearing of the sound source in the water environment.

More recently, laser-based techniques for specific underwater applications for acoustic detection have been developed. U.S. Pat. No. 6,188,644 describes using a laser Doppler vibrometer to measure vibrations from an air-water boundary located in the water volume in order to detect underwater sound. The air-water boundary creates a free surface that can extend within the water volume, therefore, not being constrained in shape or size. However, such an air-water boundary may only be achieved on the surface of a supercavitating object. Also, U.S. Pat. No. 6,349,791 describes an acoustic sensor assembly used in a submarine bow that employs a laser scanner deployed behind an acoustic panel, placed between the inner and outer hulls of the submarine. While such a configuration allows a user to obtain acoustic data from the outer hull of the submarine, such data may be inaccurate due to the normal placement of a transducer between the inner and outer hull surfaces of a submarine, which can create interference due to the acoustics reflecting between the outer hull and the transducer. Also, installation of a separate panel between the inner and outer hulls may be cumbersome and costly.

Therefore, it is desired to provide a laser-based acoustic sensor/transducer for a variety of underwater applications that is cost effective, easily installed, and does not interfere with other acoustic devices used by underwater objects.

SUMMARY OF THE INVENTION

The invention proposed herein comprises an acoustic sensor for use to determine the acoustic signature of structures underwater. Specifically, the sensor is designed to provide the acoustic signature of structures such as ship hulls and torpedo casings. The acoustic sensor described herein uses a laser-based technique that provides accurate acoustic signatures of such devices that does not interfere with other acoustic devices used within these structures.

Accordingly, it is an object of this invention to provide a high bandwidth sensor compared to ceramic transducers that have mechanical resonance structures that limit the bandwidth of acoustic sensitivity. The optical sensor can detect vibrations from 1 Hz up to several GHz, although practically the supporting sensor electronics limit the bandwidth range to several hundred kHz.

Accordingly, it is an object of this invention to provide a means for a wide aperture acoustic receiver, potentially spanning the length of the marine vessel's structure.

Accordingly, it is an object of this invention to provide an acoustic sensor for underwater structures that does not interfere with other acoustic sensors employed with the structures.

Accordingly, it is an object of this invention to provide an efficient velocity sensor for measuring on underwater pressure release structures.

It is a further object of this invention to provide an acoustic sensor that is relatively simple to install and relatively low cost.

This invention meets these and other objectives related to improved acoustic underwater sensors by providing an acoustic sensor for detecting the acoustic pressure placed upon a structure in an underwater environment. The sensor provides an optically reflective material adhered to one side of the structure. The optical coating is used to enhance the optical reflection of light back to the sensor. Although diffuse and specular reflectors would allow detection, retro-reflectors provide a high optical return over a wide range of incident angles. A laser interferometer provides laser beams to a plurality of points across the reflective material. The laser interferometer has receiving optics to receive the reflection of the laser beams back from the plurality of points. Within the laser interferometer, a reference laser beam is maintained. The laser interferometer also includes signal processing capability to compare the frequency modulation of the reference laser beam to the frequency modulation of the reflected beams. Thus, allowing the sensor to determination the vibration of the reflective material (and the adhered structure), and, in turn, the acoustic pressure on the structure.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF PREFERRED EMBODIMENTS

The invention, as embodied herein, comprises an improved acoustic sensor for use in providing the acoustic signature associated with underwater structures such as ship hulls, submarine hulls, and torpedo casings. The acoustic sensor of the present invention employs similar principles to those described in U.S. Pat. No. 6,188,644, which is incorporated by reference herein.

In general, the present invention is an acoustic sensor used in underwater applications. The sensor comprises a reflective material adhered to the inner side of a structure, such as an outer submarine hull. A laser interferometer is placed on the side of the structure with the reflective material. The laser interferometer sends a plurality of laser beams, in sequence or all at one time, to a plurality of points across the retro-reflective material. The laser beams reflect back to the interferometer, which captures the reflected beams using receiving optics. The phase modulation of the reflected laser beams is compared to a reference laser beam within the interferometer to obtain the vibration characteristics of the reflective material. Since the reflective material is adhered to the structure, the structure vibration is the same as the vibration of the reflective material. From this vibration, the acoustic pressure associated with the structure may be calculated.

Figure 1:
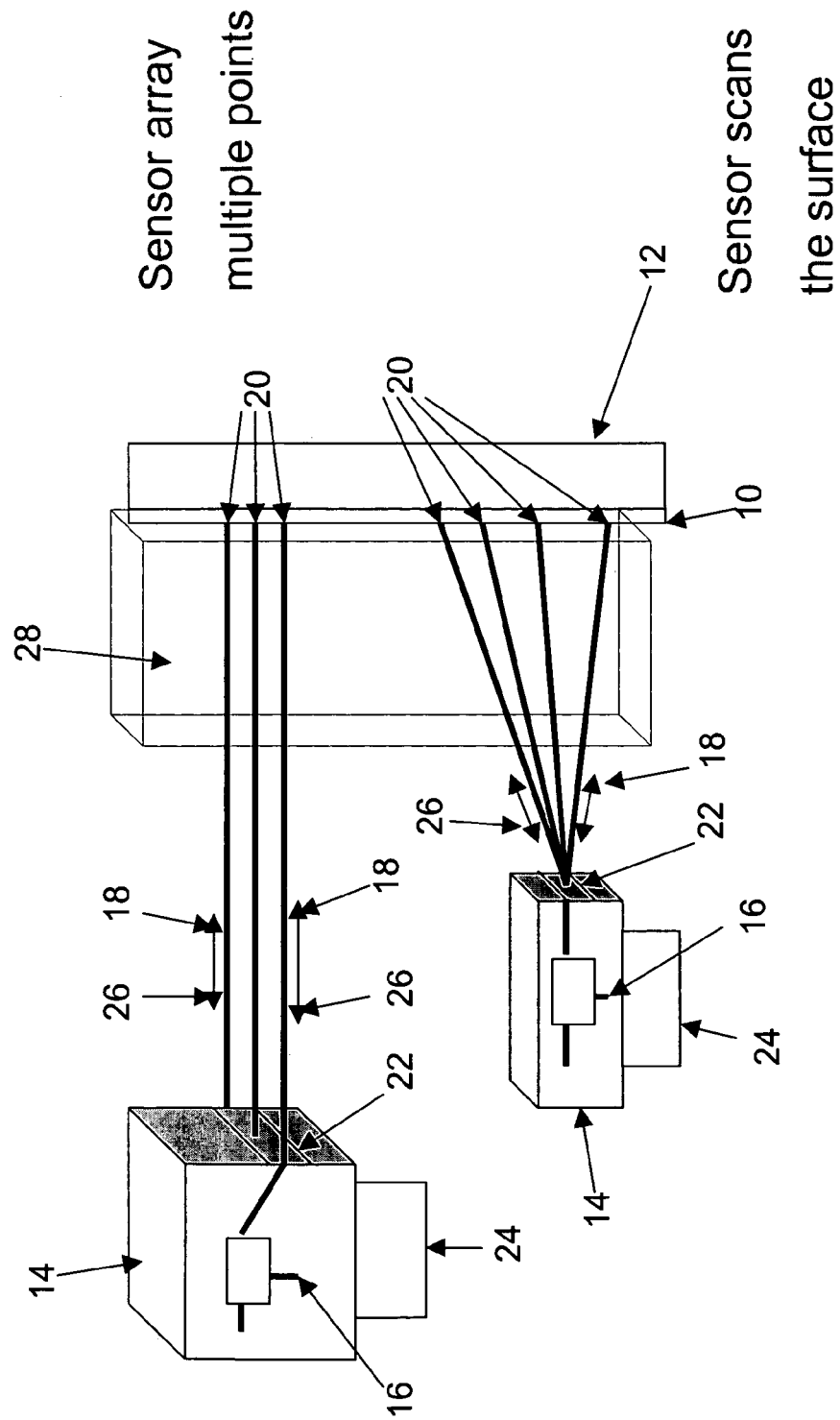
FIG. 1 is an embodiment of the present invention employing a laser interferometer having a laser scanner.

Referring to FIG. 1, the invention comprises a reflective material 10 that is adhered, in this embodiment, directly to one side of a structure 12 for which an acoustic signature is desired. A retro-reflective material would be a preferred type of reflective coating that would provide a high percentage of optical reflection over a wide range of incidence angles. As used herein, the term retro-reflective material means a material that reflects light directly back to its source, regardless of the angle that the light strikes the material. Use of a retro-reflective material would allow for laser scanning of the detection structure surface. One or more laser interferometers 14 are placed on the side of the structure 12 with the reflective material 10.

An interferometer 14 contains a beam splitter which splits a laser beam emitted from the interferometer 14 into a reference beam 16, which remains within the interferometer 14, and, therefore, maintains the beams original characteristics, and an exit beam 18, which interacts with the environment, and, therefore, may change its characteristics. An interferometer also includes receiving optics 22 that can receive laser beams so that a signal processor 24 may process said received laser beams.

In the present invention, the one or more laser interferometers 14 provide a plurality of exit beams 18 that contact the reflective material at a plurality of points 20 across the surface of the reflective material 10. If a simple reflective material, rather than a retro-reflective material, is used in the present invention, the interferometers 14 should be placed so that the exit beams 18 strike the reflective material 10 at perpendicular angles so that the exit beams 18 return as reflected beams 26 directly to the interferometers 14. If a retro-reflective material is used for the reflective material 10, due to the characteristics the retro-reflective material 10, the exit beams 18 contact the plurality of points 20 and reflect directly back to the receiving optics 22, regardless of the angle that the exit beams 18 strike the reflective material 10. If the reflective material 10 is vibrating due to acoustic pressure from the side of the structure 12 opposite the reflective material 10, because the reflective material 10 is adhered to the structure, the phase modulation of the exit beams 18 should change after striking the reflective material 10. After the receiving optics 22 receive the reflected exit beams 26, the signal processor 24 can identify the vibration of the reflective material 10 by determining the difference between the phase modulation in the reflected exit beams 26 and the reference beam 16, still within the interferometer 14. The sensor provides information (voltage) indicating the surface velocity at the laser probe point. The signal processor may calculate the acoustic pressure, P being administered to the structure 12 from the measured velocity, v. The acoustic pressure is related to the particle velocity using the expression: $v=(P)/(\rho c)$; where $(\rho c)$ is the characteristic acoustic impedance of the water medium.

In one embodiment of the invention, pressurized gas 28 may be provided between the interferometer 14 and the reflective material 10. While numerous gases may be employed, the preferred gas is air. The pressurized gas 28 allows a user to obtain extremely accurate data related to the vibration of the retro-reflective material 10 due to the gas/liquid boundary created by the pressurized gas 28 on one side of the structure 12 and the water on the opposite side of the structure 12 as is more fully described in U.S. Pat. No. 6,188,644 which has been previously incorporated herein. However, the pressurized gas 28 is not necessary for function of the invention, but would create a pressure release surface. The pressure release surface doubles the velocity at the surface, improving the optical sensor's detection and can mathematically be expressed as: $v=(2P)/(\rho c)$. Alternatively, a hull structure fabricated with a pressure release coating would likewise enhance the acoustic velocity sensor detection [reference: M. Moffett, NUWC TM 941143, November 1994.]

The reflective material 10 may be selected by one skilled in the art in conjunction with description provided herein. Preferably, the reflective material 10 is a reflective material selected from the group of a polymeric material, a reflective paint material, and retro-reflective materials such as a material containing glass micro-spheres, with a polymeric material being most preferred for diffuse, specular or retro-reflective properties to ensure sensor operation. Most preferably, the reflective material 10 is a retro-reflective material selected from one of the groups of materials previously mentioned. Along with the characteristic of reflection as described above, the preferred reflective material 10 should be flexible enough to allow vibration equal or greater to that of the structure 12, to ensure the physical integrity of the reflective material remains intact.

The structure 12 may be any material that provides optical return to the sensor and vibrates sufficiently so that the interferometer 14 and signal processor 24 can determine a phase modulation change between the reference beam 16 and reflected exit beams 26. Preferably, the structure 12 comprises a ship hull, a submarine hull, or the casing of a torpedo.

The laser interferometer 14 may be selected by one skilled in the art to meet the requirements set forth in the description herein. One interferometer 14 that can emit multiple laser beams at one time or several interferometers 14 that each emit one laser beam may be employed in the present invention. An interferometer 14, such as a laser scanner, that rotates to emit laser beams across a surface over a time interval may also be used (see FIG. 2). The interferometer should also include receiving optics 22 that can receive the reflections of the emitted beams 18. The interferometer 14 should be capable of providing multiple emitted beams 18 to a plurality of points 20 across the retro-reflective material 10, so that the vibrations across a cross-section of the retro-reflective material 10 may be determined. This allows a user to obtain acoustic pressure data regarding the structure 12 across the structure 12 at several points, providing more comprehensive data regarding the acoustic pressure than could be obtained via a single point.

The signal processor 24 may be contained within and be part of the interferometer 14, or may be a separate unit that receives data from the interferometer 14. The signal processor 24 may also be selected by one skilled in the art, as long as it has the capability to differentiate the phase modulation of different laser beams. Preferably, the signal processor 24 also calculates acoustic pressure on the structure 12 based upon the optical phase modulation differences as described herein.

Figure 2:
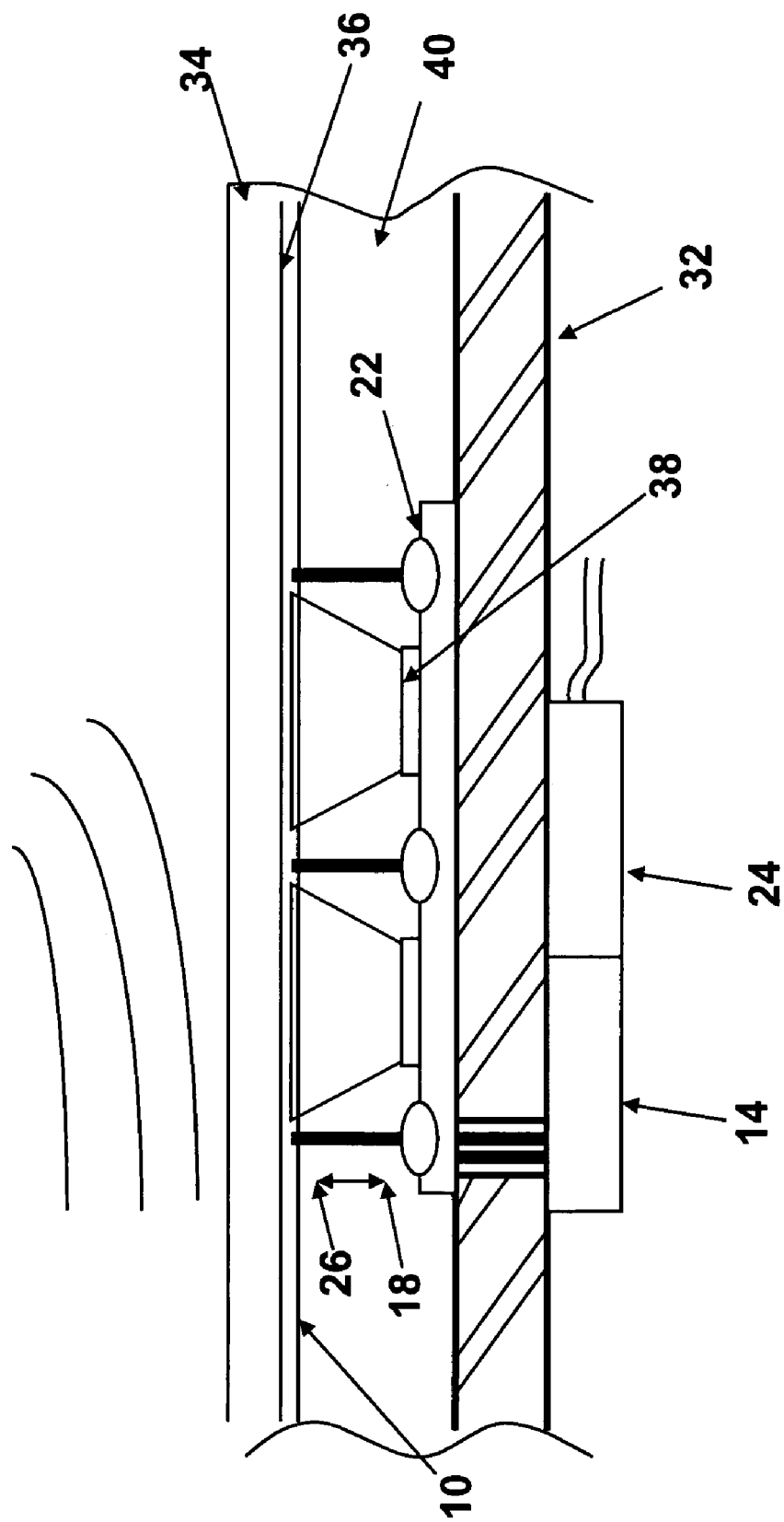
FIG. 2 is an embodiment of the present invention employing a laser interferometer that produces multiple laser beams.

Referring to FIG. 2, a specific employment of the acoustic sensor of the present invention is depicted. The acoustic sensor is deployed between the inner 32 and outer 34 hulls of a submarine, within either an acoustically transparent or pressure release hull structure. Normally, the outer hull 34 of a submarine may have an acoustically transparent material 36 adhered to a portion of its surface. The term acoustically transparent material, as used herein, means that the material has an acoustic impedance nearly identical to the environment in which it is employed (for example, a water environment in the present example). This acoustically transparent material 36 is used in order to provide a "window" for a transducer 38 which is normally placed between the inner 32 and outer 34 hulls. Thus, a sensor employed within this area must be designed not to interfere with (or be interfered by) the transducer 38. The area between the hulls 32, 34 is normally filled with a fluid.

In this embodiment of the invention, the retro-reflective material 10 is adhered to the acoustically transparent material 36, which, as described above, is adhered to the outer hull 34, for which the sensor is employed to obtain acoustic pressure data. The laser interferometer 14, including receiving optics 22 and signal processor 24, is placed so that acoustic signals from the transducer 38 do not interfere with operation of the present invention. Examples of such placement locations include to the sides, above, or under the transducer 38. The acoustic sensor operates in this embodiment as described above, however, the acoustically transparent material 36 vibrates in conjunction with the outer hull 34 and the reflective material. Thus, the optical sensors are transparent to any resident ceramic acoustic transducers. Alternatively, pressure release hull structures 12 may be coated with the reflective material 10. One example of a pressure release hull structure 12 is a hull structure 12 with an area filled with gas 40 on the side of the hull structure 12 opposite the reflective material 10. This will increase the measurable surface velocity, improving laser sensor performance.

Finally, the present invention also includes a method of detecting the acoustic pressure on an underwater structure using the device described herein.

What is described are specific examples of many possible variations on the same invention and are not intended in a limiting sense. The claimed invention can be practiced using other variations not specifically described above.

What is claimed is:

1. An acoustic sensor for detecting an acoustic signature of a structure in an underwater environment, comprising:
   a reflective material adhered to a side of the structure; and
   at least one laser interferometer, maintaining a reference laser beam, providing laser beams to a plurality of points across the reflective material, having receiving optics to receive a reflection of the laser beams from the plurality of points;
   a signal processor to measure vibration of the reflective material by comparing a phase modulation of the reference laser beam to phase modulations of the reflection of the laser beams.

2. The acoustic sensor of claim 1, wherein the reflective material comprises a retro-reflective material.

3. The acoustic sensor of claim 2, wherein the laser interferometer produces multiple laser beams.

4. The acoustic sensor of claim 2, wherein the interferometer comprises a laser scanner, rotating to provide the laser beams to the plurality of points.

5. The acoustic sensor of claim 2, wherein the retro-reflective material is selected from the group of a polymeric material, a reflective paint material, and a material containing glass micro-spheres.

6. The acoustic sensor of claim 5, further comprising an acoustically transparent material between the retro-reflective material and the structure.

7. The acoustic sensor of claim 6, wherein the acoustically transparent material comprises a polymeric substrate.

8. The acoustic sensor of claim 5 further comprising a gas on a side of the structure opposite the retro-reflective material, creating a pressure release surface.

9. The acoustic sensor of claim 1, further comprising a pressurized gas between the laser interferometer and the reflective material.

10. The acoustic sensor of claim 9, wherein the pressurized gas comprises air.

11. A method of detecting acoustic pressure on an underwater structure, comprising the steps of:
    coating a side of the structure with a reflective material;
    using a laser interferometer, maintaining a reference beam, to provide laser beams to a plurality of points on the reflective material;
    receiving laser beams reflected back from the reflective material by receiving optics within the laser interferometer;
    comparing phase modulations between the reference beam and the reflected laser beams; and
    determining the acoustic pressure from said compared phase modulations.

12. The method of claim 11, further comprising the step of adhering the side of the structure with an acoustically transparent material prior to the coating step.

13. The method of claim 12, further comprising the step of providing a pressurized gas between the laser interferometer and the reflective material.

* * * * *